Dec. 16, 1930.   M. F. BATES   1,785,241
DEAD RECKONING TRACER
Filed March 17, 1925

Inventor
Mortimer F. Bates.
By his Attorney
Herbert H. Thompson

Patented Dec. 16, 1930

1,785,241

UNITED STATES PATENT OFFICE

MORTIMER F. BATES, OF BROOKLYN, NEW YORK, ASSIGNOR, BY MESNE ASSIGNMENTS, TO SPERRY GYROSCOPE COMPANY, INC., OF BROOKLYN, NEW YORK, A CORPORATION OF NEW YORK

DEAD-RECKONING TRACER

Application filed March 17, 1925. Serial No. 16,146.

This invention relates to dead reckoning tracers which are designed to produce a visible indication or record upon a map or chart of the course and position of a craft. While my invention is capable of use for the aforesaid broad purpose, it will be found particularly adapted for use upon vehicles or craft which are intended to operate or maneuver within a prescribed area. My invention will be found of great utility in assisting an operator to attain any objective within the confines of his map or chart and to know his exact position at all times, and will prove of the greatest value in such vehicles as tanks, which are totally enclosed so that the operator or operators therein cannot get their bearings outside of the craft.

It is a further object of this invention to provide means for making a record on a chart which shall show the actual course of the craft over rough terrain within the scope of and to the scale of the chart being used. For this purpose it is necessary to provide means for eliminating from the record the vertical component of travel when the vehicle is moving uphill or downhill, since it is only the horizontal component of such travel that measures the actual distance traveled. It is further necessary in order to accomplish this purpose, where the record of travel is made upon a movable chart, to provide some means for traversing the recording pen porportionally to any lateral component of movement of the vehicle out of parallel with the lengthwise movement of the chart. In this case, the deviation or change in heading is indicated by a line at an angle to the longitudinal axis of the chart, and as the chart is normally driven in proportion to the scale of the chart and the ground speed of the vehicle, the said angularly disposed line indicating deviation will actually indicate a distance greater than the distance traveled by the vehicle. To correct for changes in heading, I provide means for automatically slowing up and reversing the movement of the chart in proportion to the angular change in heading of the vehicle and conversely increasing the movement of the chart in the same or opposite direction as the course of the vehicle again approaches parallelism with the longitudinal axis of the chart. In this manner complicated maneuvers may be executed by the vehicle within the limits of the chart and will be accurately traced to scale on the chart.

Further objects of this invention will become apparent in the following detailed description thereof.

In the accompanying drawings

Figure 1:
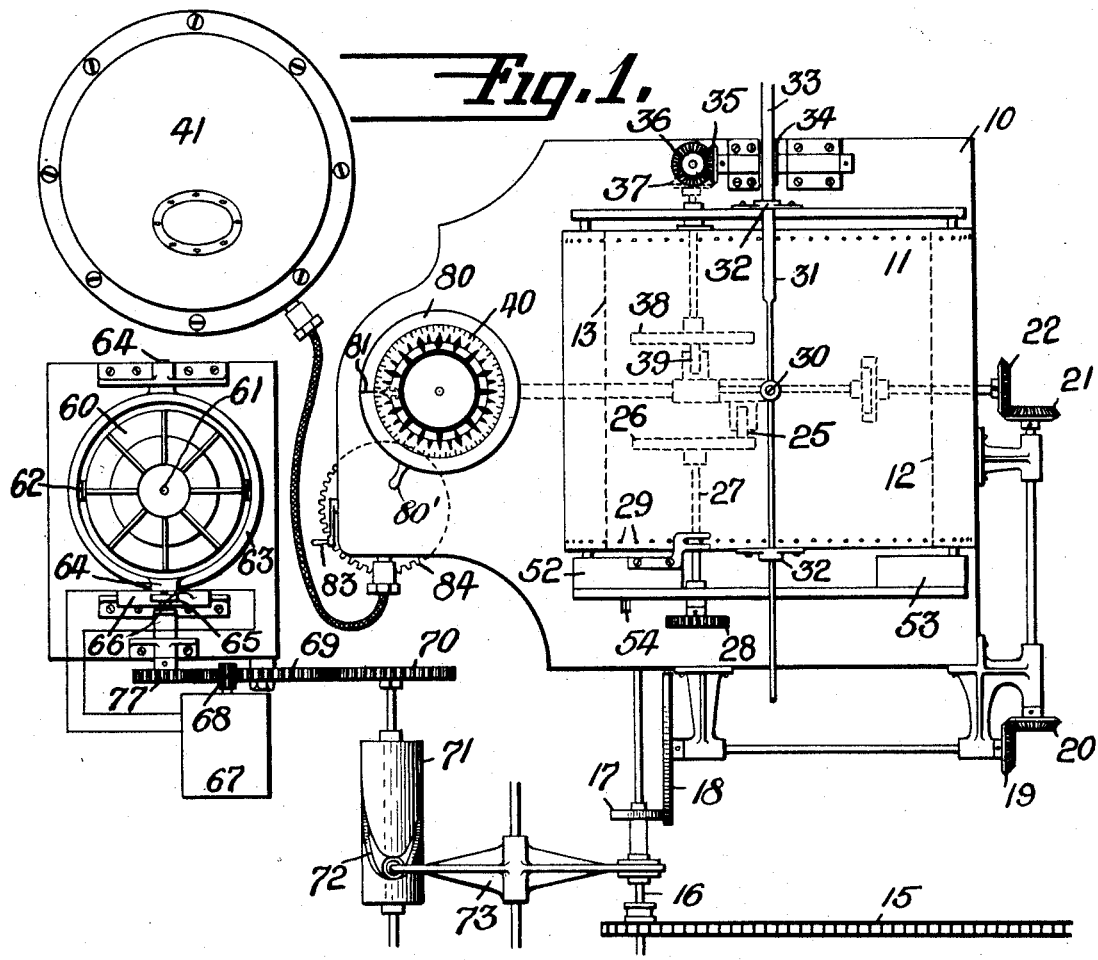
Fig. 1 is a plan view of a dead reckoning tracer embodying my invention.
Figure 2:
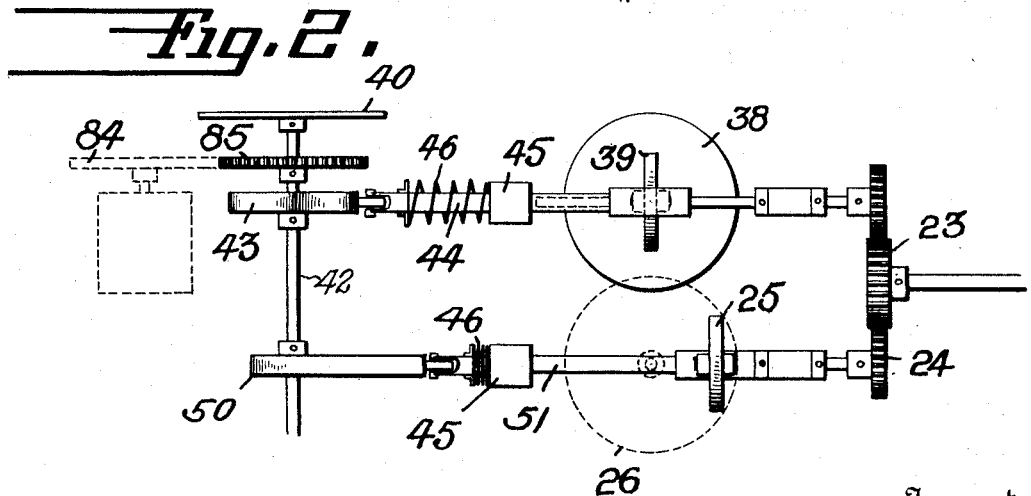
Fig. 2 is a front elevation of certain variable driving mechanism in the indicator of Fig. 1.

Referring to the drawings I have shown my dead reckoning tracer as applied to a vehicle by means of a frame or platen 10 movable integrally with said vehicle and upon which the indicator is mounted. Said tracer comprises a moving chart 11, which may be of the roll type, adapted to be wound or unwound from one roll 12 to the other 13. Said chart may be driven to unwind the same from roll 12 and wind it upon roll 13 by some suitable driving mechanism, which, in the present instance, may comprise a chain 15 driven from an axle of the vehicle proper to drive a shaft 16, and thence by way of variable friction gearing 17—18, the purpose of which will be hereinafter more fully described, and gearing 19—20—21—22—23—24 and variable friction gearing 25—26, the purpose of which will be also more fully described hereinafter, to rotate shaft 27, and thence through suitable gearing, only one element 28 of which is shown, to drive sprocket wheels, not shown, adapted to engage perforations 29 in the chart 11 to feed the same. Clock springs 52, 53 are provided on each roller by which tension is maintained on the chart. A square shank at 54 is provided for a key by which the springs can be wound up.

Upon said chart is adapted to operate a marker or stylus 30 carried upon a bar 31 operating in suitable bearings 32 and having a rack 33 formed at one end thereof, engaging with a pinion 34 whereby, upon rotation of the pinion in one direction or the other, the stylus 30 may be operated transversely of the chart 11. The pinion 34 may be actuated through a train of gearing, such as 35—36—37, and the variable friction gear drive 38—39, the purpose of which will be more fully described hereinafter, to be operated from a direction indicator, which may be a repeater compass 40 controlled by a master gyroscopic compass 41 or other azimuth indicator such as shown, for example, in the patent to Elmer A. Sperry, No. 1,255,480, granted February 5, 1918. The repeater compass 40 may be positioned on frame 10 if desired, and the master compass 41 may be located any place within the vehicle, the said repeater compass 40 being controlled from a distance in the ordinary and well known manner.

In order that compass 40 may control the stylus 30 to operate the same when change in heading occurs, there is mounted upon the same shaft 42 that carries the card 40 a cam 43 which engages a shaft 44 slidable in a suitable bearing 45 and carrying the friction roller 39 at its other end. A spring 46 maintains the shaft 44 in engagement with said cam. The parts are so positioned that when the vehicle is on any heading corresponding to the horizontal axis of a particular strip of chart or map, shaft 44 engages that portion of the cam which will cause friction disc 39 to stand in the center of friction disc 38 so that there is no movement of said friction disc 38 and hence no movement of the gear train 35—36—37 or of the stylus 30 in a direction transverse to the chart. So that if the course to be maintained is represented by a line drawn centrally, longitudinally of the chart 11 and the stylus is initially placed upon said line or any line parallel thereto when the vehicle is trained upon said course, then the continued movement of the vehicle on the prescribed course will cause stylus 30 to mark a line coincident with, or parallel to, the longitudinal axis of the chart 11. If, however, the vehicle deviates from the initial heading, then shaft 44 will engage other portions of the cam 43 to cause friction disc 39 to rotate in one direction or the other according to the direction of deviation and thus move stylus 30 transversely of chart 11 in one direction or the other to trace a line at an angle to the central longitudinal line.

It will be understood that as the chart 11 moves in proportion to the ground speed of the vehicle and the scale of the chart, then the length of the line traced by stylus 30 will represent according to scale the actual linear miles traversed. This is the case, however, only when stylus 30 is stationary on the chart 11. If a deviation of course is recorded then said line will be at an angle to the central line and would be longer were it not for compensation introduced for change of heading, because the said line of deviation bears to the central line the relation of a hypothenuse of a right-angled triangle to its side. In order that lines indicating deviation from course shall also represent true linear distances according to the same scale as before, I provide means for slowing up the chart relative to the ground speed when such deviation occurs and in proportion to the degree of said deviation. For this purpose I mount upon the same shaft 42 that carries cam 43 a similar cam 50 positioned with respect to said cam 43 so as to be opposite in phase thereto. Thus, when shaft 44 is in engagement with the portion of the cam 43 which causes friction disc 39 to be positioned centrally of friction disc 38, shaft 51 is in such position relative to cam 50 as to cause friction disc 25 to be positioned at the extreme outer edge of friction disc 26. Interpreting this another way, when the vehicle is travelling on a course where stylus 30 is stationary, a line traced on the chart by the movement of the chart will correspond to scale with the actual distance covered by the vehicle. This will also be true when the vehicle changes its heading because friction disc 39 moves outwardly on friction disc 38, and friction disc 25 moves inwardly on friction disc 26 to slow up the chart in accordance with the explanation hereinbefore given. The lines indicating changes of heading can thus be measured according to the same scale as lines parallel to axis of chart to give a true indication of distance traveled, and the path followed by the vehicle is accurately traced on the map.

In the case of a vehicle which may travel upon courses other than truly horizontal, it will be apparent that the vertical component of movement will ordinarily introduce an error in the record or position indicated on the map. In order that the said record may indicate accurately on the map, I provide a second means for controlling the speed ratio of the chart with respect to the ground speed of the vehicle when the vehicle travels on any but a horizontal course and for controlling it in proportion to the degree of inclination of said vehicle. For this purpose I may provide a gyroscope 60, including a rotor having a vertical spinning axis 61 journaled in a casing which is itself journaled upon horizontal bearings 62 in a gimbal ring 63 supported on horizontal bearings 64 at right angles to bearings 62. This is a vertical gyro for maintaining a horizontal base-line and is so positioned that any inclination of the vehicle will cause relative movement about axis 64. Such movement will cause relative movement between trolley 65 moving with the vehicle and contacts 66 maintained in a horizontal plane by the said vertical gyro, so that said trolley 65 moves into engagement with one or the other of said contacts to close the circuit through a motor 67 which operates a train of gearing 68—69—70 to actuate a cam roller 71. Said cam roller is provided with a cam slot 72 in which operates one end of a member 73, the other end of which is slidable upon shaft 16 and carries therewith the friction disc 17. The parts are so positioned that when the vehicle is traveling horizontally and trolley 65 is on the insulated strip between the two contacts 66, then member 73 is at the outer end of cam slot 72 to maintain friction disc 17 at the outer edge of friction disc 18 to drive the chart at its greatest speed relative to the ground speed of the vehicle. When, however, the vehicle becomes inclined and contact 65 engages one or the other of contacts 66, then cam roller 71 is operated to move member 73 and friction disc 17 toward the center of friction disc 18 to slow up the speed of the chart relative to the ground-speed of the vehicle. Motor 67 operates follow-up gears 69 and 77 to return trolley 65 to neutral position. It will be understood that the greater the inclination the longer the time during which motor 67 operates, and the further toward the center of disc 18 will disc 17 be operated, or in other words, the greater the inclination the slower the speed of chart 11 compared with the ground speed of the vehicle.

For synchronizing a given strip of chart or map, there may be rotatably mounted on frame 10 a ring 80 having frictional engagement therewith, so that it may be moved relative to the frame by handle 80'. Ring 80 carries the lubber line 81 shown in its zero position, which, in conjunction with the card 40, can be synchronized with the master compass. The process of setting for a given chart or map whose heading is known by its longitudinal or lengthwise axis is as follows: The vehicle is turned until the required heading is indicated on the master compass. This turning of the vehicle with respect to card 40, however, will have moved shaft 44 out of engagement with the portion of cam 43 which it should engage when the vehicle is on the required heading so that friction disc 39 may occupy the center of friction disc 38. To remedy this condition a hand synchronizing mechanism is provided. Therefore, to synchronize the chart with the cams 43 and 50, after the vehicle has been given the proper heading, set lubber line 81 on zero and by handcrank 83 move the repeater card until its north point coincides with the lubber line, then shift lubber line until the repeater card reads the same as the master compass. In this position cams 43 and 50 will be properly positioned with respect to push rods 44 and 51, and the lubber-line will correctly indicate on the repeater card the course of the vehicle.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In combination with a vehicle, a dead reckoning tracer comprising recording mechanism including a movable chart and a marker, means whereby said marker is moved in accordance with deviations from a predetermined course in azimuth of said vehicle, means for moving said chart, and means whereby said last named means is effective only as long as said vehicle has a component of travel along said course.

2. In combination with a vehicle, a dead reckoning tracer comprising recording mechanism including a movable chart and a marker, means whereby said marker is moved in accordance with deviations from a predetermined course in azimuth of said vehicle, and means for moving said chart continuously as long as said vehicle has a component of travel along said course and for reversing the movement of said chart when said vehicle has a component of travel in a direction opposite to said course.

3. In combination with a vehicle, a dead reckoning tracer comprising recording mechanism including a movable chart and a marker, means whereby said marker is moved in accordance with deviations from a predetermined course in azimuth of said vehicle, means for moving said chart, and means for controlling the rate of movement of said chart in accordance with the degree of deviation of said vehicle from said course.

4. In combination with a vehicle, a dead reckoning tracer comprising recording mechanism including a movable chart and a marker, means whereby said marker is moved in accordance with deviations from a predetermined course in azimuth of said vehicle, means for moving said chart, and means for decreasing the rate of movement of said chart as the degree of deviation of said vehicle from said course increases.

5. In combination with a vehicle, a dead reckoning tracer comprising recording mechanism including a movable chart and a marker, means whereby said marker is moved at a rate proportional to the degree of deviation of said vehicle from a predetermined course, and means for moving said chart at a rate inversely proportional to the rate of movement of said marker.

6. In combination with a vehicle, a dead reckoning tracer comprising recording mechanism including a movable chart and a marker, means whereby said marker is moved in accordance with deviations from a predetermined course in azimuth of said vehicle, means for moving said chart continuously as long as said vehicle has a component of travel along said course and for reversing the movement of said chart when said vehicle has a component of travel in a direction opposite to said course, and means for moving said chart at a rate inversely proportional to the rate of movement of said marker.

7. In combination with a vehicle, a dead-reckoning tracer comprising recording mechanism including a movable chart and a marker, means whereby said marker is actuated in accordance with the course of said vehicle, means for moving said chart, and means for controlling the rate of movement of said chart in accordance with the course of said vehicle in azimuth and in elevation.

8. In combination with a vehicle, a dead-reckoning tracer comprising recording mechanism including a movable chart and a marker, means including a repeater compass for actuating said marker in accordance with the course of said vehicle, said repeater compass having a shiftable lubber line, means whereby the position of said compass relative to said chart may be predetermined and means for adjusting said lubber line so that the repeater compass may always bear predetermined relation to the chart and at the same time indicate the actual heading in azimuth of the vehicle.

9. In a vehicle having a master compass, a dead-reckoning tracer comprising recording mechanism including a movable chart and a marker, means whereby said marker is actuated in accordance with the course of said vehicle, means for moving said chart, and means for controlling the rate of movement of said chart in accordance with the course of said vehicle in azimuth, said last named means including said master compass, a repeater compass actuated thereby, and means for synchronizing said repeater compass relative to said master compass and for adjusting the relationship between said chart and said repeater compass, said repeater compass having means whereby it may bear a predetermined relation to the chart and at the same time indicate the actual heading in azimuth of the vehicle regardless of said adjustment relative to the chart.

10. In combination with a vehicle, a dead-reckoning tracer comprising recording mechanism including a movable chart and a marker, means whereby said marker is actuated in accordance with the course of said vehicle, means for moving said chart, and means for controlling the rate of movement of said chart in accordance with the course of said vehicle in elevation, said last named means including a universally mounted gyroscope.

11. In combination with a vehicle, a dead-reckoning tracer comprising recording mechanism including a movable chart and a marker, means whereby said marker is actuated in accordance with the course of said vehicle, means for moving said chart including a variable gearing, and means for controlling the rate of movement of said chart in accordance with the course of said vehicle in azimuth, said last named means including a compass, a cam controlled thereby, and means whereby said cam controls said variable gear.

12. In combination with a vehicle, a dead-reckoning tracer comprising recording mechanism including a movable chart and a marker, means whereby said marker is actuated in accordance with the course of said vehicle, means for moving said chart including a variable gearing, and means for controlling the rate of movement of said chart in accordance with the travel of said vehicle in elevation, said last named means including a universally mounted gyroscope, a cam controlled thereby, and means whereby said cam controls said gearing.

13. In combination with a vehicle, a dead-reckoning tracer comprising recording mechanism including a movable chart and a marker, means whereby said marker is actuated in accordance with the course of said vehicle, means for moving said chart including a plurality of variable gearings, and means for controlling the rate of movement of said chart in accordance with the travel of said vehicle in azimuth and in elevation, said last named means including a compass, means for maintaining a horizontal base line, a cam controlled by said compass, a second cam controlled by said last named means, and means whereby said cams control said gearings.

14. In combination with a vehicle, a dead-reckoning tracer comprising recording mechanism including a movable chart and a marker, means whereby said marker is actuated in accordance with the course of said vehicle, means for moving said chart including a plurality of variable gearings, and means for controlling the rate of movement of said chart in accordance with the travel of said vehicle in azimuth and in elevation, said last named means including a compass, a universally mounted gyroscope, a cam controlled by said compass, a second cam controlled by said gyroscope, and means whereby said cams control said gearings.

In testimony whereof I have affixed my signature.

MORTIMER F. BATES.